United States Patent Office 3,429,674
Patented Feb. 25, 1969

3,429,674
OIL-SOLUBLE NITROGEN COMPOSITION
Donald I. Hoke, Chagrin Falls, Ohio, assignor to The Lubrizol Corporation, Wickliffe, Ohio, a corporation of Ohio
No Drawing. Original application Feb. 2, 1962, Ser. No. 170,820. Divided and this application Aug. 19, 1965, Ser. No. 481,061
U.S. Cl. 44—58       16 Claims
Int. Cl. C10m *1/32;* C10l *1/22, 1/06*

ABSTRACT OF THE DISCLOSURE

An oil-soluble fatty acid-amine reaction product useful as additives in hydrocarbon oils especially lubricating compositions for internal combustion engines such as two-cycle spark ignition engines.

---

This is a division of copending application Ser. No. 170,820, filed Feb. 2, 1962, now Patent No. 3,251,853.

This invention relates to novel compositions of matter and in a more particular sense to oil-soluble nitrogen compositions. The compositions of this invention are useful as additives in hydrocarbon oils and especially lubricating compositions for internal combustion engines such as two-cycle (i.e., two-stroke) spark ignition engines.

The lubrication of a two-cycle internal combustion engine is provided by an oil-fuel mixture. In this situation, the combustion characteristics of the oil are as important as its lubricating characteristics in maintaining proper performance of the engine. While mineral lubricating oils provide a desirable and economical source of the oil for use in such engines, they are unfortunately characterized by a tendency to form harmful products of combustion. Such products eventually agglomerate to form deposits in the engine and are a principal cause of not only excessive engine wear but also other difficulties such as spark plug fouling, piston ring sticking, etc. Hence, in recent years a great deal of effort has been devoted to the improvement in the combustion characteristics of lubricating oils for use in two-cycle engines.

Accordingly it is a principal object of this invention to provide additives for use in lubricating compositions, especially lubricating compositions for use in two-cycle engines.

It is also an object of this invention to provide additives useful in hydrocarbon oils.

It is also an object of this invention to provide lubricating compositions.

It is further an object of this invention to provide concentrates containing additives for use in hydrocarbon oil.

It is further an object of this invention to provide novel compositions of matter.

It is further an object of this invention to provide a process for preparing novel compositions of matter.

These and other objects are attained in accordance with this invention by providing an oil-soluble, nitrogen-containing composition prepared by the process comprising heating at a temperature above about 100° C. a mixture comprising an amine selected from the class consisting of alkyl amines, amino-alkyl amines, and hydroxyalkyl amines with an acid-producing compound selected from the class consisting of branched chain acids having the structural formula

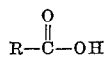

and the anhydrides and the esters thereof, in which structural formula R is a branched chain, substantially hydrocarbon radical having from 14 to about 20 aliphatic carbon atoms in the principal chain and at least one aliphatically substituted, pendant aryl group.

The above process can be carried out simply by mixing the two reactants and heating the mixture to a temperature of at least about 100° C., or alternatively by adding one reactant to the other. The presence in the process of a solvent is often advantageous to facilitate mixing and temperature control. The solvent may be a hydrocarbon or an inert polar solvent. It is illustrated by benzene, toluene, xylene, naphtha, n-hexane, cyclohexane, dodecane, octane, chlorobenzene, ethylene dichloride, dioxane, ether, chloroform, carbon tetrachloride, or nitrobenzene.

The reaction which characterizes the above process is believed to result in a product having predominantly amide or amidine linkages, the latter including both linear and cyclic amidine linkages such as are found in imidazolines. The product most likely contains a mixture of these linkages. In case of an amine reactant containing a tertiary amino group the product will contain amine carboxylate salt linkages. The formation of these linkages from the reaction of an alkylene amine and an acid is accompanied with the formation of water and may be represented by the following equations:

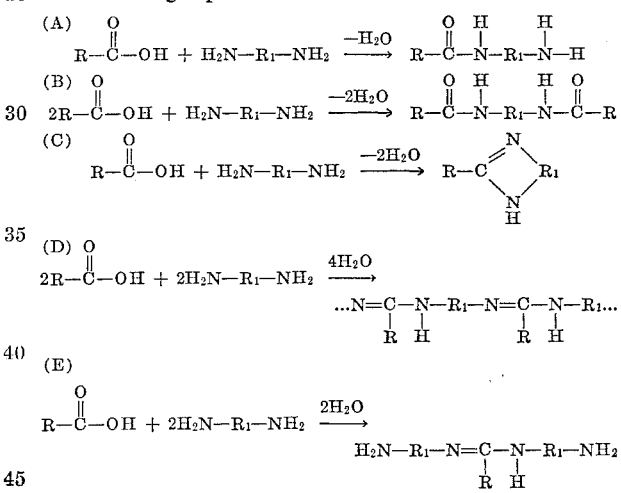

wherein R is as defined previously and $R_1$ is an alkylene radical. It will be noted that both oxygen atoms of the acid reactant may be replaced with nitrogen atoms to form amidine linkages. It will be noted also that if an ester is used in lieu of the acid as the reactant, an alcohol will be formed as a by-product.

The temperature at which the process is carried out depends primarily upon the nature of the reactants used and the product desired. In general, the reaction temperature should be at least about 100° C., preferably between 120° C. and 250° C. A still higher temperature may be used provided that it does not exceed the decomposition point of the reaction mixture. Also, a relatively high temperature, usually above 150° C., is preferred to give a product having predominantly the amidine linkages.

The relative proportions of the two reactants depend upon the number of the nitrogen atoms in the amine reactant, the type of the linkages desired in the product, and the stoichiometry of formation of such linkages. The preferred ratio of the reactant is one equivalent of the acid-producing reactant to one to two equivalents of the amine. In some instances, however, as much as two equivalents of the acid-producing reactant may be used for each equivalent of the amine. To illustrate, as much as 10 equivalents and at little as 0.5 equivalent of an acid may be used for one mole of an alkylene amine having 5 nitrogen atoms per molecule. The equivalent weight of the acid-producing compound is based upon the number of the carboxylic radicals and that of the amine is based upon the number of amino radicals in a molecule.

The critical aspect of the nitrogen-containing compositions of this invention resides in the structure of the R radical derived from the acid-producing reactant. This radical should contain, first, a principal chain having from 14 to 20 saturated, aliphatic carbon atoms and, second, at least one pendant group which is an aliphatically substituted aryl radical. The criticality is associated with the oil-solubility and peculiar effectiveness of the nitrogen-containing compositions characterized by such an R radical in the applications contemplated for this invention.

The principal chain of the R radical is exemplified by a radical derived from tetradecane, pentadecane, hexadecane, heptadecane, octadecane, and eicosane. The pendant group is illustrated by tolyl, xylyl, n-isopropylphenyl, p - dodecylphenyl, o,p - diheptylphenyl, alpha-hexyl-beta-naphthyl, o - methoxyphenyl, 2,4,6 - trimethylphenyl, or m-hexylphenyl radical. Specific examples of the aromatically substituted aliphatic acids include 9-tolyl-octadecanoic acid, 10-(o,p-di-tert-butylphenyl)-octadecanoic acid, 10-xylyl-octadecanoic acid, 9 - (alpha-heptyl - beta-naphthyl)-octadecanoic acid, 8-tolyl-eicosanoic acid, and 12-(2,4,6-trimethylphenyl)-heptadecanoic acid.

A convenient method for preparing such acids involves the reaction of an aromatic compound with an unsaturated acid in the presence of a Friedel-Crafts catalyst such as aluminum chloride, ferric chloride, zinc chloride, sulfuric acid, phosphoric acid, boron trifluoride, or the like. The reaction may be carried out at a temperature between room temperature and 150° C. or even higher and in general is effected simply by mixing the reactants for a sufficient period and recovering the desired product by freeing it from the catalyst. To illustrate, xylyl-stearic acid (most likely a mixture of 9- and 10-xylyl-octadecanoic acids) can be prepared by the reaction of oleic acid and xylene in the presence of aluminum chloride as the catalyst.

The anhydrides and the esters of the branch-chain acids illustrated above likewise are useful for the preparation of the nitrogen-containing compositions of this invention. The anhydrides may be obtained, for instance, by the reaction of a halide of such an acid with an alkaline metal salt of such an acid at a relatively high temperature. The esters useful herein include principally those derived from relatively low boiling alcohols such as methanol, ethanol, isopropanol, n-butanol, n-pentanol, and other alcohols boiling below about 120° C. In some instances, an aromatic ester such as the phenyl ester of the acid likewise may be used. The preparation of the esters can be effected by direct esterification of the acid with the alcohol or by the reaction of the acid halide with an alkali metal alcoholate. The reaction conditions employed for preparing the anhydrides and the esters by these and other methods are known in the art.

The amines useful for preparing the oil-soluble, nitrogen-containing compositions of this invention include alkyl amines, amino-alkyl amines, and hydroxy-alkyl amines. The alkyl amines are illustrated by, e.g., methylamine, N-methyl-ethylamine, N-methyl-octylamine, N-cyclohexyl-octylamine, cyclohexylamine, dibutylamine, dodecylamine, benzylamine, octadecylamine, triethylamine, and dicyclohexylamine. The primary amines and the secondary amines are preferred and those having a total of no more than 30 carbon atoms in a molecule are especially useful.

The amino-alkyl amines contemplated for use herein are for the most part the alkylene amines conforming to the structure

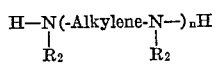

in which $n$ is an integer preferably less than ten and $R_2$ is a substantially hydrocarbon or a hydrogen radical. The alkylene radical is exemplified by an ethylene, propylene, butylene, trimethylene, tetramethylene, pentamethylene, hexamethylene, octamethylene, or decamethylene radical. Specific examples of such alkylene amines are ethylenediamine, diethylenetriamine, triethylenetetramine, propylenediamine, tripropylenetetramine, tetraethylenepentamine, trimethylenediamine, pentaethylenetetramine, di-(trimethylene)diamine, pentaethylenetetramine, decamethylene)triamine, tri(hexamethylene)tetramine, decamethylenediamine, N-octyl trimethylenediamine, N,N'-dioctyl propylenediamine, N-dodecyl ethylenediamine, and N,N'-dimethyl propylenediamine.

The alklene amines include also those containing cyclic linkages such as are found in imidazolidines, imidazolines, and piperazines. Cyclic polyamines in which the amino nitrogen atoms are separated by at least one and no more than 3 carbon atoms are especially useful. Such amines may be illustrated by imidazoline, piperazine, 2 - methyl - imidazoline, 2-heptyl-1-(2-aminopropyl)imidazolidine, 4-methyl-imidazoline, 1,3-bis(2-aminoethyl)imidazoline, pyrimidine, 1-(2-aminopropyl)piperazine, 1,4-bis(2 - aminoethyl)piperazine, 1-(2-(2-aminoethylamine) ethyl)piperazine and 2-methyl-1-(2-aminobutyl)piperazine. Higher homologues such as are obtained by condensing two or more of the above-illustrated alkylene amines likewise are useful.

The hydroxy-alkyl amines include for the most part the above-illustrated alkyl amines and alkylene amines containing one or more hydroxy radicals on the alkyl groups, preferably no more than one hydroxy radical on each alkyl group. Examples of the hydroxy-alkyl amines are 2-hydroxyethylamine, bis(2-hydroxyethyl)amine, tris(2-hydroxyethyl)amine, 3 - hydroxypropylamine, bis(3 - hydroxypropyl)amino, N - (2 - hydroxypropyl)octylamine, N-(2-hydropropyl)octadecylamine, etc.

Alkylene amines having one or more hydroxyalkyl substituents on the nitrogen atoms also are contemplated for use in preparing the polar-substituted amines of this invention. Those having one hydroxy-alkyl substituent on a nitrogen atom in which the alkyl group is a lower alkyl group, i.e., having less than about 6 carbon atoms, are especially useful. Examples include N-(2-hydroxyethyl)ethylenediamine, N,N' - bis(2-hydroxyethyl)ethylenediamine, 1-(2-hydroxyethyl)piperazine, monohydroxypropyl-substituted diethylenetriamine, 1,4-bis(2-hydroxypropyl)piperazine, di - (hydroxypropyl-substituted)tetraethylenepentamine, N-(3-hydroxypropyl)tetramethylenediamine, and 2-heptadecyl-1-(2-hydroxyethyl) imidazoline.

Higher homologues such as are obtained by condensation of the above-illustrated alkylene amines or hydroxy-alkyl-substituted alkylene amines through amino radicals or through hydroxy radicals are likewise useful. It will be appreciated that condensation through amino radicals results in the formation of a higher amine accompanied with ammonia and that condensation through the alcohol linkages results in products containing ether linkages and removal of water.

The ethylene amines are preferred. They are discussed in some detail under the heating, "Ethylene Amines," in "Encyclopedia of Chemical Technology," Kirk and Othmer, vol. 5, pages 989–905, Interscience Publishers, New York (1950). Such compounds are prepared most conveniently by the reaction of ethylene or propylene dichloride with ammonia. This process results in the production of somewhat complex mixtures of ethylene amines including cyclic condensation products such as piperazines and these mixtures find use herein. On the other hand quite satisfactory products may be obtained also from pure ethylene amines. An especially useful ethylene amine, for reasons of economy as well as effectiveness as a dispersant, is a mixture of ethylene amines prepared by the reaction of ethylene chloride with ammonia having a composition which corresponds to that of tetraethylene pentamine.

The following examples illustrate the preparation of the nitrogen-containing compositions of this invention (parts are by weight):

Example 1

To a mixture of 2960 parts (10 molar proportions) of methyl oleate and 4240 parts (40 molar proportions) of xylene there is added at 25°–95° C. 1466 parts (11 molar proportions) of aluminum chloride throughout a period of 1 hour. The reaction mixture is heated at 80°–90° C. for 2 hours and then poured into cold water to free the product from the aluminum chloride catalyst. The organic layer is washed with a dilute aqueous hydrochloric acid and then with water. It is then dried, heated to 140° C./20 mm. and filtered. The filtrate is the methyl ester of xylyl-stearic acid having a saponification number of 137 (theory: 139). A mixture of 2950 parts (7.2 equivalents) of the methyl ester of xylyl-stearic acid and 544 parts (14 equivalents) of tetraethylene pentamine is heated to 210° C. in 2 hours and then at 210°–215° C. for 2.5 hours while nitrogen is bubbled through the reaction mixture. A mixture of methanol and water is collected as the distillate. The residue is heated to 180° C./30 mm. and yields an oil-soluble product (3205 parts) having a nitrogen content of 5.8% (theory: 6.4%).

Example 2

An oil-soluble, nitrogen-containing composition is prepared by heating at 210°–220° C. for 2 hours a mixture of 378 parts (1 equivalent) of xylyl-stearic acid and 68 parts (1.92 equivalents) of diethylene triamine. The product has a nitrogen content of 6.1% (theory: 6.9%), an acid number of 11 (phenolphthalein), and a base number of 98 (bromphenol blue).

Example 3

An oil-soluble, nitrogen-containing composition is prepared by heating at 150°–162° C. a mixture of xylyl-stearic acid (1 molar proportion) and tetraethylene pentamine (0.3 molar proportion).

Example 4

An oil-soluble, nitrogen-containing composition is prepared by the procedure of Example 3 except that 2-hydroxyethylamine (1 mole) is used in lieu of the tetraethylene pentamine used.

Example 5

An oil-soluble, nitrogen-containing composition is prepared by heating a mixture of dodecylamine (1 equivalent) and heptylphenyl-heptadecanoic acid at 150° C.

Example 6

An oil-soluble, nitrogen-containing composition is prepared by the procedure of Example 2 except that diethylphenyl-stearic acid is used in place of the xylyl-stearic acid used (replacement on a chemical equivalent basis).

Example 7

An oil-soluble, nitrogen-containing composition is prepared by the procedure of Example 2 except that the diethylene triamine is replaced, on a chemically equivalent basis, with 2-aminoethyl-piperazine.

Example 8

An oil-soluble, nitrogen-containing composition is prepared by the procedure of Example 2 except that the diethylene triamine is replaced, on a chemically equivalent basis, with N-(2-aminoethyl)octadecylamine.

Example 9

An oil-soluble, nitrogen-containing composition is prepared by the procedure of Example 2 except that the diethylene triamine is replaced, on a chemically equivalent basis, with dicyclohexylamine.

An important characteristic of the products of this invention is their oil-solubility. This characteristic is associated with the structural constitution of the R radical of the products. In this regard, it is known in the art that amides and amidines of straight-chain, saturated aliphatic acids such as stearic acid are not soluble in a mineral oil; nor are the amides and the amidines oil-soluble which are derived from such acids containing a pendant aryl group without an aliphatic substituent. However, it is discovered in accordance with this invention that the products in which the R radical contains an aliphatically substituted aryl pendant group are oil-soluble. They are soluble even though the aliphatic substituent is a lower alkyl radical such as ethyl or methyl radical which by itself is usually regarded not to possess a significant oleophilic character. The criticality of the aliphatic substituent on the pendant aryl group is shown by the comparison that whereas the products obtained by the procedures of the above examples are soluble in SAE 40 mineral oil at concentrations of 1%, 5%, 10%, or even higher, the otherwise similar products prepared from stearic acid and phenyl-stearic acid have been found not to be soluble in oil at the above-stated concentrations.

The principal utility of the oil-soluble, nitrogen-containing compositions prepared by the process of this invention is as additives in the fuel-oil mixture for use in two-cycle internal combustion engines. In this application they are effective in reducing engine wear and minimizing the tendency of the fuel-oil mixture to cause spark plug fouling and to form harmful engine deposits. Their effectiveness is shown by the results (Table I) of a two-cycle engine test. In this test a 60-horsepower, two-cycle, three-cylinder outboard motor is subjected to cycling operations, each cycle consisting of 55 minutes of full throttle operation (5500–5600 r.p.m.) and 5 mintues of idling (600–700 r.p.m.) under the following conditions: water inlet temperature, 78–82° F.; water outlet temperature, 140°–180° F.; and tank temperature, 95°–105° F. The test period is 50 hours unless excessive spark plug fouling is observed. The fuel-oil mixture used in the test consists of 720 parts (by volume) of a regular leaded gasoline having an octane number of 93–94 and 18 parts (by volume) of a SAE 40 mineral lubricating oil containing the chemical additive. The effectiveness of the additive is measured in terms of the piston cleanliness on a scale of 0 to 10 (0 being indicative of extremely heavy deposits and 10 being indicative of no deposit) and the average life of the spark plugs, i.e., the number of changes of spark plugs made necessary by fouling during the testing period.

TABLE I

| Test sample | Additive, percent by weight of sample | Test results | | |
|---|---|---|---|---|
| | | Test period (hours) | Average plug life (hours) | Average piston rating |
| 1 | Example 1, 1.38 | 50 | 12.5 | 7.9 |
| 2 | Example 6, 1.38 | 50 | 12.5 | 7.7 |
| 3 | The product prepared by the procedure of Example 7 except that the acid used was oleic acid, 1.4 | 50 | | 4.7 |
| 4 | None | 50 | ¹ 5 | ¹ 5.5 |

¹ Less than about.

The gasolines useful as the fuels for two-cycle engines may be of regular or premium grade having an octane number from about 80 to about 110. They may contain an anti-knock agent such as tetraethyl lead or tetramethyl lead and a scavenger such as ethylene dibromide or ethylene dichloride. In lieu of the gasoline diesel fuel likewise is useful in two-cycle internal combustion engines. The lubricating base oils useful in the fuel-oil mixture for two-cycle engines are usually characterized by viscosity values from about 30 to about 200 SUS (Saybolt Universal Seconds) at 210° F. The most commonly used oils are the mineral lubricating oils having viscosity values from about 40 to about 120 SUS at 210° F. They are exemplified by mineral lubricating oils of SAE 10 to SAE 50 grades.

The relative proportions of the lubricating oil to the gasoline in the oil-fuel mixture may vary within wide ranges such as from a ratio of about 1:120 to a ratio of about 1:5, respectively, by volume. The preferred ratio is from 1:10 to about 1:60, respectively, of the lubricating oil to the gasoline.

The oil-fuel mixtures for two-cycle engines may contain other additives such as metal-containing detergents, corrosion-inhibiting agents, oxidation-inhibiting agents, etc. The metal-containing detergents are exemplified by the alkaline earth metal salts of oil-soluble acids, e.g., mahogany sulfonic acid and didodecylbenzene sulfonic acid. The metal salts include both the normal salts and the basic salts, the latter describing the metal salts in which the metal is present in a stoichiometrically greater amount than the organic acid radical. Specific examples of the metal-containing detergents are calcium salt of mahogany sulfonic acid, strontium salt of mahogany sulfonic acid, basic barium salt of didodecylbenzene sulfonic acid obtained by carbonating a mixture of a mineral oil, a sulfonic acid and barium hydroxide (5 chemical equivalents per equivalent of the acid) in the presence of a promoting agent such as octylphenol (one equivalent per equivalent of the acid). Other metal-containing detergents include the alkaline earth metal salts of organic phosphorus acids prepared by the treatment of an olefin polymer (such as polyisobutene having a molecular weight of about 1000) with a phosphorus sulfide (such as phosphorus pentasulfide or phosphorus heptasulfide). These metal salts likewise may be normal or basic salts.

The corrosion-inhibiting agents and the oxidation-inhibiting agents are exemplified by phenolic compounds such as 2,6-dibutyl-4-methylphenol, 4,4'-methylene-bis(2-tert-butyl - 6-isopropylphenol), 2-methyl-6-tert-butyl-4-heptylphenol, and sulfurized heptylphenol. Arylamines and sulfurized hydrocarbons likewise are useful as inhibiting agents. They include, for example, sulfurized dipentene (obtained by the reaction of two moles of dipentene with one mole of sulfur at 150° C.), the reaction product of turpentine (4 moles) with phosphorus pentasulfide (1 mole), N,N'-dibutyl phenylenediamine, N-phenyl naphthylamine and dibutyl tetrasulfide.

The concentrations of the chemical additives in the oil-fuel mixtures depend to some extent upon the oils and fuels used and the types of service to which the oil-fuel mixtures are to be subjected. In most applications the nitrogen-containing composition of the invention is present in the oil-fuel mixture at concentrations ranging from 0.00% to about 2%, preferably from 0.01% to 3% by weight of the mixture. The concentration of the other additives may each range from 0.0001% to 2% by weight of the mixture.

The following examples illustrate further the fuel-oil mixtures containing the oil-soluble, nitrogen-containing compositions of this invention (the relative proportions of the fuel and the lubricating oil are expressed in parts by volume whereas the concentration of the additives are expressed in percentages by weight of the oil-fuel mixture).

Example A

| | |
|---|---|
| SAE 20 mineral lubricating oil _____part__ | 1 |
| Gasoline having an octane number of 98 ____parts__ | 20 |
| The product of Example 1 _____percent__ | 0.15 |

Example B

| | |
|---|---|
| SAE 30 mineral lubricating oil _____part__ | 1 |
| Gasoline having an octane number of 100 __parts__ | 16 |
| The product of Example 2 _____percent__ | 0.05 |

Example C

| | |
|---|---|
| SAE 50 mineral lubricating oil _____part__ | 1 |
| Gasoline having an octane number of 85 __parts__ | 30 |
| The product of Example 3 _____percent__ | 0.1 |

Example D

| | |
|---|---|
| SAE 40 mineral lubricating oil _____part__ | 1 |
| Gasoline having an octane number of 95 __parts__ | 50 |
| The product of Example 4 _____percent__ | 0.05 |
| 4,4'-methylene-bis(2,6-ditert-butylphenol) __percent__ | 1 |

Example E

| | |
|---|---|
| SAE 60 mineral lubricating oil _____part__ | 1 |
| Gasoline having an octane number of 99 __parts__ | 20 |
| The product of Example 1 _____percent__ | 0.025 |
| Barium salt of mahogany sulfonic acid __percent__ | 0.01 |

What is claimed is:

1. A mineral oil composition containing a small amount, sufficient to improve its anti-wear properties and reduce its tendency to form deposits, of an oil-soluble, nitrogen-containing composition prepared by the process comprising heating at a temperature above about 100° C. a mixture comprising an amine selected from the class consisting of alkyl amines, amino-alkyl amines, and hydroxy-alkyl amines, with an acid-producing compound selected from the class consisting of the branched chain acids having the structural formula

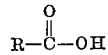

and the anhydrides and the esters thereof, in which structural formula R is branched chain, substantially hydrocarbon radical having from 14 to about 20 saturated aliphatic carbon atoms in the principal chain and at least one aliphatically substituted aryl pendant group.

2. The composition of claim 1 wherein the amine reactant is an alkylene amine.

3. The composition of claim 1 wherein the acid-producing compound is an alkaryl-substituted aliphatic carboxylic acid having from 14 to about 20 saturated carbon atoms in the aliphatic radical.

4. A mineral oil composition containing a small amount, sufficient to improve its anti-wear properties and reduce its tendency to form deposits, of an oil-soluble, nitrogen-containing composition prepared by the process comprising heating at a temperature above about 100° C. a mixture comprising an alkylene amine with from about 1 equivalent to about 5 equivalents of an alkaryl-substituted aliphatic carboxylic acid having from about 14 to about 20 saturated carbon atoms in the aliphatic radical.

5. The mineral oil composition of claim 4 wherein the alkylene amine is a polyethylene polyamine having from 2 to 6 amino groups.

6. The mineral oil composition of claim 4 wherein the acid is xylyl-stearic acid.

7. The mineral oil composition of claim 4 wherein the alkylene amine is a mixture of ethylene polyamines having an average composition corresponding to that of tetraethylene pentamine.

8. A mineral oil composition containing a small amount, sufficient to improve its anti-wear properties and reduce its tendency to form deposits, of an oil-soluble, nitrogen-containing composition prepared by the process comprising heating at a temperature above about 100° C. a mixture comprising tetraethylene pentamine and about 2 equivalents of xylyl-stearic acid.

9. A fuel-oil mixture suitable for use in two-cycle engines comprising gasoline, lubricating oil, and a small amount, sufficient to improve its anti-wear properties and reduce its tendency to form deposits, of an oil-soluble, nitrogen-containing composition prepared by the process comprising heating at a temperature above about 100° C. a mixture comprising an amine selected from the class consisting of alkyl amines, amino-alkyl amines, and hydroxy-alkyl amines, with an acid-producing compound selected from the class consisting of the branched chain acids having the structural formula $$R-\overset{O}{\underset{\|}{C}}-OH$$

and the anhydrides and the esters thereof, in which structural formula R is branched chain, substantially hydrocarbon radical having from 14 to about 20 saturated aliphatic carbon atoms in the principal chain and at least one aliphatically substituted aryl pendant group.

10. The fuel-oil mixture of claim 9 wherein the amine reactant is an alkylene amine.

11. The fuel-oil mixture of claim 9 wherein the acid-producing compound is an alkaryl-substituted aliphatic carboxylic acid having from 14 to about 20 saturated carbon atoms in the aliphatic radical.

12. A fuel-oil mixture suitable for use in two-cycle engines comprising gasoline, a mineral lubricating oil, and a small amount, sufficient to improve its anti-wear properties and reduce its tendency to form deposits, of an oil-soluble, nitrogen-containing composition prepared by the process comprising heating at a temperature above about 100° C. a mixture comprising an alkylene amine with from about 1 equivalent to about 5 equivalents of an alkaryl-substituted aliphatic carboxylic acid having from about 14 to about 20 saturated carbon atoms in the aliphatic radical.

13. The fuel-oil mixture of claim 12 wherein the alkylene amine is a polyethylene polyamine having from 2 to 6 amine groups.

14. The fuel-oil mixture of claim 12 wherein the acid is xylyl-stearic acid.

15. The fuel-oil mixture of claim 12 wherein the alkylene amine is a mixture of ethylene polyamines having an average composition corresponding to that of tetraethylene pentamine.

16. A fuel-oil mixture suitable for use in two-cycle engines comprising gasoline, a mineral lubricating oil, and a small amount, sufficient to improve its anti-wear properties and reduce its tendency to form deposits, of an oil-soluble, nitrogen-containing composition prepared by the process comprising heating at a temperature above about 100° C. a mixture comprising tetraethylene pentamine and about 2 equivalents of xylyl-stearic acid.

References Cited
UNITED STATES PATENTS

| | | | |
|---|---|---|---|
| 1,649,485 | 11/1927 | Orelup | 44—66 |
| 1,990,365 | 2/1935 | Beale | 44—58 |
| 2,917,376 | 12/1959 | Stromberg et al. | 44—63 |

DANIEL E. WYMAN, *Primary Examiner.*

Y. H. SMITH, *Assistant Examiner.*

U.S. Cl. X.R.

44—63, 66; 252—51.5